(12) United States Patent
Al-Haj Ali et al.

(10) Patent No.: US 12,186,683 B2
(45) Date of Patent: Jan. 7, 2025

(54) SEPARATING DEVICE FOR SEPARATING VOLATILE COMPOUNDS FROM A POLYMER REACTION MIXTURE

(71) Applicant: Borealis AG, Vienna (AT)

(72) Inventors: Mohammad Al-Haj Ali, Porvoo (FI); Kauno Alastalo, Porvoo (FI)

(73) Assignee: BOREALIS AG, Vienna (AT)

( * ) Notice: Subject to any disclaimer, the term of this patent is extended or adjusted under 35 U.S.C. 154(b) by 681 days.

(21) Appl. No.: 17/418,662

(22) PCT Filed: Jan. 24, 2020

(86) PCT No.: PCT/EP2020/051804
§ 371 (c)(1),
(2) Date: Jun. 25, 2021

(87) PCT Pub. No.: WO2020/152348
PCT Pub. Date: Jul. 30, 2020

(65) Prior Publication Data
US 2022/0072451 A1    Mar. 10, 2022

(30) Foreign Application Priority Data
Jan. 25, 2019   (EP) .................................... 19153675

(51) Int. Cl.
| | |
|---|---|
| *C08F 6/10* | (2006.01) |
| *B01D 1/00* | (2006.01) |
| *B01D 3/06* | (2006.01) |
| *B01D 17/02* | (2006.01) |
| *B01D 17/025* | (2006.01) |
| *B01D 19/00* | (2006.01) |
| *C08F 6/12* | (2006.01) |
| *C08F 10/02* | (2006.01) |

(52) U.S. Cl.
CPC ........... *B01D 19/0036* (2013.01); *B01D 1/00* (2013.01); *B01D 3/06* (2013.01); *B01D 17/0208* (2013.01); *B01D 17/0214* (2013.01); *C08F 6/10* (2013.01); *C08F 6/12* (2013.01); *C08F 10/02* (2013.01)

(58) Field of Classification Search
None
See application file for complete search history.

(56) References Cited

U.S. PATENT DOCUMENTS

| | | | | |
|---|---|---|---|---|
| 2008/0099371 | A1* | 5/2008 | McCoy | .................. C10G 55/04 208/45 |
| 2011/0172337 | A1* | 7/2011 | Devoy | ...................... C08F 6/12 422/138 |
| 2016/0053601 | A1 | 2/2016 | Nicholson | |
| 2016/0282251 | A1 | 9/2016 | Wang et al. | |
| 2016/0362506 | A1 | 12/2016 | Costin et al. | |
| 2018/0058764 | A1* | 3/2018 | Hong | ........................ F28D 7/04 |

FOREIGN PATENT DOCUMENTS

| | | |
|---|---|---|
| KR | 20100024493 A | 3/2010 |
| WO | WO 2011008955 A1 | 1/2011 |
| WO | WO2017/108969 * | 6/2017 |

OTHER PUBLICATIONS

International Search Report dated May 4, 2020 from PCT/EP2020/051804.

* cited by examiner

*Primary Examiner* — David J Buttner
(74) *Attorney, Agent, or Firm* — Lippes Mathias LLP

(57) ABSTRACT

The current application is related to a process for separating volatile compounds from a reaction mixture comprising a polymer and said volatile compounds, comprising the steps of passing the reaction mixture through the inlet into the gravimetric vessel of the gravimetric separator of a separating device according to the present invention, withdrawing a first polymer-rich stream comprising mainly polymer through the first outlet of the gravimetric vessel, withdrawing a first polymer-lean stream comprising mainly volatile compounds through the second outlet of the gravimetric vessel, passing at least a part of the polymer-lean stream as a second polymer-lean stream through the first inlet into the flash vessel of the flash separator of the separating device according to the present invention, withdrawing a liquid stream through the first outlet of the flash vessel, and withdrawing a gaseous stream through the second outlet of the flash vessel.

10 Claims, 1 Drawing Sheet under pressure applicable in gravimetric separators.

SEPARATING DEVICE FOR SEPARATING VOLATILE COMPOUNDS FROM A POLYMER REACTION MIXTURE

This application is a 371 of PCT Application Serial No. PCT/EP2020/051804 filed Jan. 14, 2020, which claims priority to European Application Serial No. 19153675.4 filed Jan. 25, 2019, the contents of which are incorporated herein in their entirety.

The present invention is concerned with a separating device for separating volatile compounds from a polymer. Furthermore, the present invention is related to a process for separating volatile compounds from a polymer using said flash separator. In particular, the separating device and the process can be used in solution polymerization processes.

BACKGROUND

Polyolefins are produced by several different conventional technologies. Typical temperatures range from 50 to 350° C. and pressures vary from 30 to 3000 bars. The polyolefins are produced at temperatures in which the polymer is dissolved in a liquid or in a supercritical mixture of unreacted monomer, unreacted comonomers and optional solvents.

The polymerisation process includes one or more polymerisation reactors. Suitable reactors include unstirred or stirred, spherical, cylindrical and tank-like vessels and recirculating loop reactors and tubular reactors. Such reactors typically include injection points for monomer, comonomer, solvent, catalyst and optional other reactants and additives and withdrawal points for reaction mixtures. In addition the reactors may include heating or cooling means.

The separation of unreacted dissolved monomer(s), comonomer(s) and possible solvents from the reaction mixture comprising a polymer melt is commonly carried out in flash separator(s), typically carried out in one or more separation stages. In the solution process, a stream of a reaction solution withdrawn from the polymerisation reactor is passed to the flash separator where ethylene with or without comonomer (i.e., propylene, 1-butene, 1-hexene, 1-octene or combination of comonomers) and hydrocarbon solvent are separated from the polymer melt. If more than one flash separator is utilized, the flash separators are generally connected in series. The volatile hydrocarbons separated from the polymer stream are usually recycled back to the feeding tank to be fed back into the polymerization process.

In such typical flash separators, the temperature and pressure are reduced. The temperature is in particular reduced below the low critical solution temperature (LCST; cf. FIG. 1). As a result, the mixture, which is fed to the flash separator, is separated into a polymer-lean vapour phase and a polymer-rich liquid phase. These two phases are separated in that the liquid phase, which is due to gravity at the bottom of the flash vessel of the flash separator, is withdrawn via an outlet at the bottom of said vessel. On the other hand, the gaseous phase is removed via an outlet at the top of the flash vessel.

The purpose of these flash separators is to achieve a 'clean' separation in terms of minimum solid (polymer) entrainment in the vapour phase. Solid polymer in the vapour phase results in a less efficient process, might lead to deposit of solid polymer in the equipment starting from the outlet for the gaseous phase of the separator and subsequent fouling of this equipment and even to blockage or failure of the whole system. Therefore, such a 'clean' separation is highly beneficial for the described polymer production systems.

Problem to be Solved

However, the approach of using flash separators is energetically not favourable. Reason is that achieving high separation efficiency in case of a reaction mixture usually taken directly from a polymer reactor affords high temperature and pressure drops in the flash separator, which correspond to high losses in energy.

Hence, to achieve a more energy efficient way of separating volatile compounds from polymers, typically gravimetric separators are implemented (cf. point X in FIG. 1). In typically used gravimetric separators no separation into a gaseous and a liquid phase is needed. Instead, conditions are used, in which the reaction mixture is split up into two liquid phases, a polymer-lean liquid phase and a polymer-rich liquid phase. The polymer-rich liquid phase is present has higher density than the polymer-lean phase and, hence, is located below the polymer-lean liquid phase. Furthermore, the polymer-lean phase comprises a small amount of polymer having a lower average molecular weight than the polymer in the polymer-rich phase, wherein the polymer-rich phase comprises a high amount of polymer having a higher average molecular weight than the polymer in the polymer-lean phase. The polymer-rich phase is removed as a polymer-rich stream from the bottom of the gravimetric separator, while the polymer-lean phase is removed as a polymer-lean stream from the top of the gravimetric separator containing the major amount of monomers, optional comonomers and optional solvents. Preferably, such gravimetric separators are generally used for recovering polymer in continuous solution polymerization processes.

In U.S. Pat. No. 6,881,800 B2 a setup is described, in which a liquid-liquid phase separator (gravimetric separator) is used to separate solvent and monomer from a reaction mixture of a solution polymerization process.

Furthermore, WO 2009/126277 A2 provides a setup, in which a gravimetric separator receives the reaction mixture and parts of the top stream of the gravimetric reactor is partially recycled to the stream entering the polymerization reactor and partially recycled to the reaction mixture stream leaving the polymerization reactor.

However, when producing low-molecular weight polymers, e.g. polymers having a significant fraction of their molecular weight distribution below 10,000 g/mol, these gravimetric separators may not provide a clean separation between the polymer product and the solvent. Reason is that the time needed for the polymer to travel from the polymer-lean phase into the polymer-rich phase is higher in gravimetric separators in comparison to flash separators since density and viscosity of the polymer-lean phase are relatively high compared to the respective properties of the vapour phase in flash separators. Polymers with high molecular weight travel faster due to higher gravimetric forces. Hence, the higher the average molecular weight, the better the separation efficiency. Therefore, entrainment of solid polymer into the vapour phase predominately occurs in case of low molecular weight polymers. As explained above for the case of flash separators, also in case of gravimetric separators such solid polymer can deposit and detrimentally foul equipment in the recycle solvent stream. Furthermore, it should be noted that in flash separators the amount of entrainment is limited, while in case of gravimetric separators, higher amounts of polymer could be entrained in the polymer-lean phase. Hence, the problem of depositing and fouling is even more prominent in case of gravimetric separators.

Document WO 2011/087728 is concerned with equipment and processes necessary to handle problems arising from fouling of polymer entrained by the top stream of a gravimetric separator. However, no solution to above-mentioned problem is provided.

Therefore, recovery of low molecular weight polymers is still usually achieved using flash separators taking into account the disadvantage of high energy consumption.

OBJECT OF THE INVENTION

It is therefore an object of the present invention to find a separating device which is able to efficiently, i.e. without solid polymer entrainment into the polymer-lean phase, separate volatile compounds from a polymer in a polymer production process for producing low-molecular weight polymers, which is not energetically as consummating as a typically solely used flash separator.

SUMMARY OF THE INVENTION

It has now surprisingly been found out that a possible way to overcome said disadvantages is to utilize a gravimetric separator and a flash separator in combination. Depending on the average molecular weight of the polymer currently produced in a production plant, either gravimetric separator is solely used (high molecular weight) or a gravimetric separator and a flash separator are used in combination.

Hence, the present invention describes a separation device, a polymer production plant layout and process for separating volatile compounds from a polymer targeting minimum polymer entrainment while still producing a wide range of high and low molecular weight polymers. The present invention ensures taking advantage of both separation technologies. Gravimetric separators guarantee energy-efficient separation, while flash separators ensure minimum polymer material entrainment into the polymer-lean phase and, hence, no fouling of the equipment.

Hence, above-mentioned problem is surprisingly solved by a separating device for separating volatile compounds from a polymer reaction mixture comprising a gravimetric separator, having a gravimetric vessel, an inlet for feeding the polymer reaction mixture, a first outlet located in the lower part of the gravimetric vessel for withdrawing a first polymer-rich stream, and a second outlet located in the upper part of the gravimetric vessel for withdrawing a first polymer-lean stream; and a flash separator having a flash vessel, a first inlet for feeding a second polymer-lean stream split from the first polymer-lean stream, a first outlet located at the lower part of the flash vessel for withdrawing a liquid stream, and a second outlet located at the upper part of the flash vessel for withdrawing a gaseous stream, wherein the second outlet of the gravimetric vessel is fluidly connected to the first inlet of the flash vessel.

Furthermore, the above-mentioned problem is surprisingly solved by a process for separating volatile compounds from a reaction mixture comprising a polymer and said volatile compounds, comprising the steps of: passing the reaction mixture through the inlet into the gravimetric vessel of the gravimetric separator of a separating device comprising a gravimetric separator having a gravimetric vessel, an inlet for feeding the polymer reaction mixture, a first outlet located in the lower part of the gravimetric vessel for withdrawing a first polymer-rich stream, and a second outlet located in the upper part of the gravimetric vessel for withdrawing a first polymer-lean stream; and a flash separator having a flash vessel, a first inlet for feeding a second polymer-lean stream split from the first polymer-lean stream, a first outlet located at the lower part of the flash vessel for withdrawing a liquid stream, and a second outlet located at the upper part of the flash vessel for withdrawing a gaseous stream, wherein the second outlet of the gravimetric vessel is fluidly connected to the first inlet of the flash vessel; withdrawing the first polymer-rich stream comprising mainly polymer through the first outlet of the gravimetric vessel; withdrawing the first polymer-lean stream comprising mainly volatile compounds through the second outlet of the gravimetric vessel; passing at least a part of the polymer-lean stream as the second polymer-lean stream through the first inlet into the flash vessel of the flash separator of said separating device; withdrawing the liquid stream through the first outlet of the flash vessel, and withdrawing the gaseous stream through the second outlet of the flash vessel.

Definitions

Flash separators have been known in the prior art for decades (also as low-pressure separators). As it is well known in the art the liquid feed is passed to a flash vessel operated at a reduced pressure. Thereby a part of the liquid phase vaporizes and can be withdrawn as an overhead stream (or a vapor stream) from the low pressure separator. The part remaining in liquid phase is then withdrawn as a bottom stream or a liquid stream from the flash vessel. Operating the low pressure separator under conditions such that both vapor and liquid phases are present in the flash vessel describes this situation. Flash separators are typically operated at a pressure of at least 1 bar.

Gravimetric separators (also usually denominated as liquid-liquid separators) comprise a vessel in which a two-phase liquid system can be separated. The liquid phase with the lower relative density (polymer-lean phase) is withdrawn from the upper end of the vessel whereas the liquid phase with the higher relative density (in the present case the polymer-rich phase) is withdrawn from the bottom end of the vessel.

The term separation efficiency as used herein is defined as the mass flow of the component withdrawn in the polymer-lean stream (gaseous stream in case of a flash separator and liquid stream in case of a gravimetric separator) divided by the (theoretical) mass flow rate of the component in the polymer-lean stream in equilibrium conditions.

The expression volatile compounds as used herein has to be understood as compounds having significantly lower molecular weight in comparison to the polymer produced in the process of the invention. Such compounds typically are present in the gaseous form when being exposed to a flash separator. In a gravimetric separator, they are typically present in the (liquid) polymer-lean stream. During polymerisation they remain in solution. Commonly, the volatile compounds comprise at least one unreacted monomer, optionally unreacted comonomer, solvent(s) and any other gaseous components present in the reaction mixture.

Figure 1:
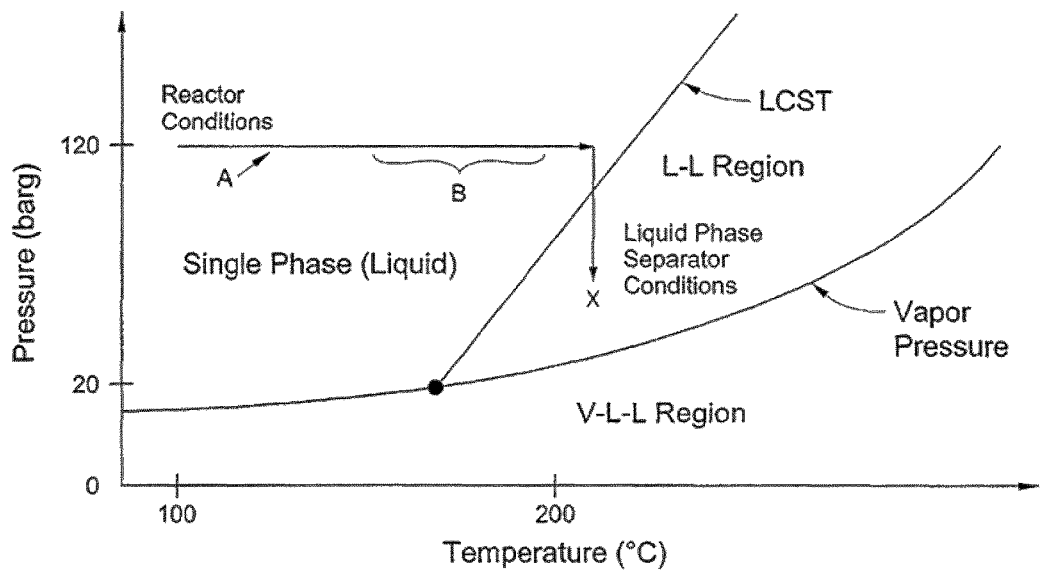
FIG. 1 shows a phase diagram illustrating the operation of a gravimetric separator used in the prior art.

REFERENCE SIGNS 1 gravimetric vessel
2 inlet of the gravimetric vessel
3 first outlet of the gravimetric vessel
4 second outlet of the gravimetric vessel
5 flash vessel
6 first inlet of the flash vessel
7 first outlet of the flash vessel
8 second outlet of the flash vessel
9 reaction mixture
10 first polymer-rich stream
11 first polymer-lean stream
12 second polymer-lean stream
13 gaseous stream (fourth polymer-lean stream)
14 liquid stream (fourth polymer-rich stream)
15 third polymer-rich stream
16 third polymer-lean stream
17 volatile compounds stream
18 second inlet of the flash vessel of the flash separator
19 second polymer-rich stream
20 polymer stream
21 first heater
22 first pressure control valve (expansion valve)
23 second heater
24 second pressure control valve (expansion valve)
25 major polymer stream (comprising the original polymer material excluding the very low molecular weight fraction, <10,000 g/mol)
26 minor polymer stream (comprising the very low molecular weight polymer fraction, <10,000 g/mol)
27 (boundary between gaseous and liquid phases in the flash vessel

DETAILED DESCRIPTION OF THE INVENTION

The separating device and the separating process of the present invention shall be explained in the following in more detail.

Separating Device of the Present Invention

Generally, in case of the production of polymers having no fractions with low molecular weights, in particular below 10,000 g/mol, it can be expected that in gravimetric separators limited entrainment of solid polymer into the polymer-lean phase occur. Therefore, the use of a gravimetric separator is expected to be sufficient for the separation of high-molecular weight polymers and there is not necessarily a need to use a separating device according to the present invention in a production plant for the production of polymers not having such low molecular weight fractions.

However, there is also no disadvantage in such a case to be expected. Hence, a polymer production plant comprising the separating device of the present invention is not limited to plants producing polymers having no low molecular weight fractions, whereas low molecular weight fractions are considered to be below 10,000 g/mol. However, a separating device according to the present invention is in particular advantageous in these cases, as solid polymer entrainment into the polymer-lean stream and deposit of solid polymer and its consequences can be prevented.

If no separating device according to the present invention is needed, the polymer-lean stream from the gravimetric separator will be recycled back to the polymerization reactor. The polymer-rich stream on the other hand will be directed towards the downstream units.

In a first embodiment of the present invention, the separating device for separating volatile compounds from a polymer reaction mixture according to the present invention comprises a gravimetric separator, having a gravimetric vessel (1), an inlet (2) for feeding the polymer reaction mixture (9), a first outlet (3) located in the lower part of the gravimetric vessel (1) for withdrawing a first polymer-rich stream (10), and a second outlet (4) located in the upper part of the gravimetric vessel (1) for withdrawing a first polymer-lean stream (11); and a flash separator having a flash vessel (5), a first inlet (6) for feeding a second polymer-lean stream (12) split from the first polymer-lean stream (11), a first outlet (7) located at the lower part of the flash vessel (5) for withdrawing a liquid stream (14), and a second outlet (8) located at the upper part of the flash vessel (5) for withdrawing a gaseous stream (13), wherein the second outlet (4) of the separator vessel (1) is fluidly connected to the first inlet (6) of the flash vessel (5).

Figure 2:
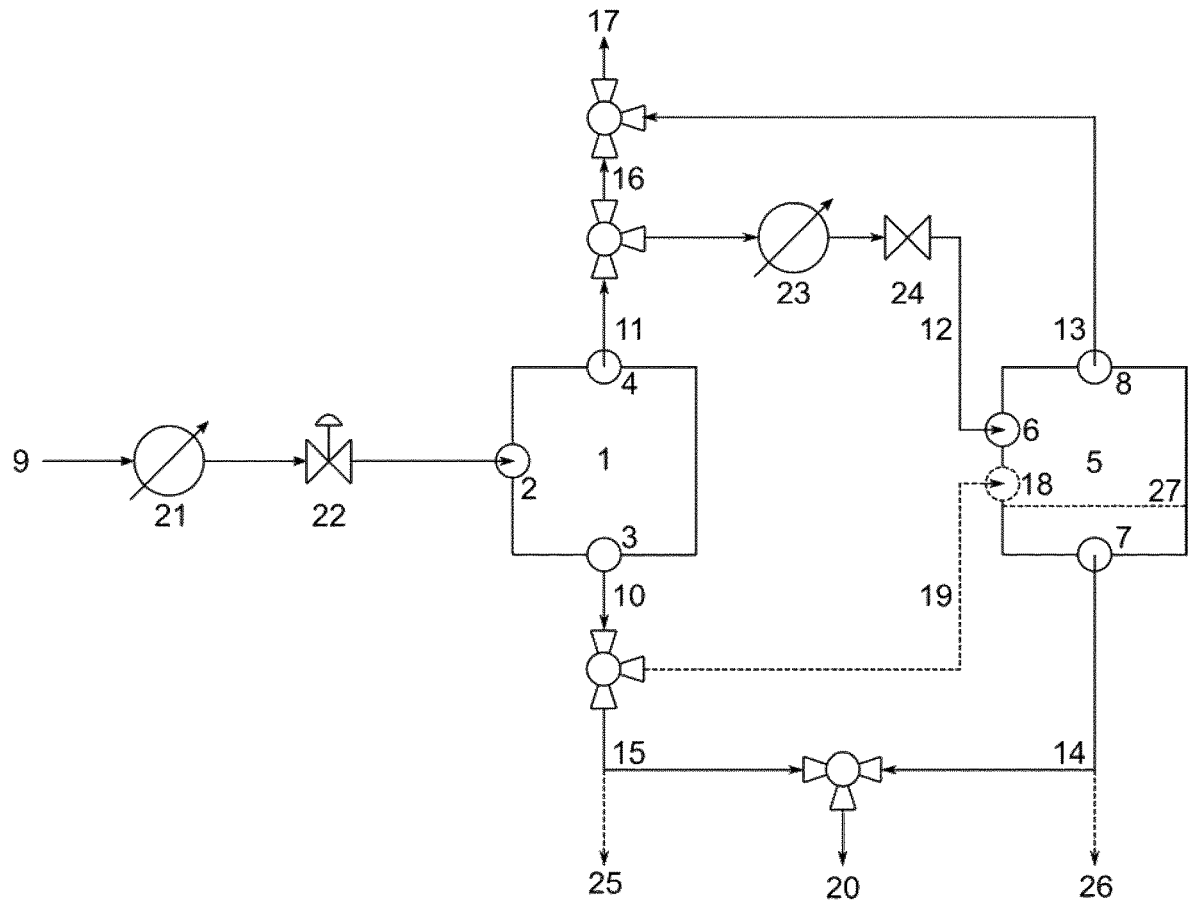
FIG. 2 is a schematic layout of a separating device according to the present invention

For this first embodiment, FIG. 2 has to be read without the conduit represented by the dotted line (19) connecting the first polymer-rich stream (10) and the second inlet of the flash vessel (18). Accordingly, this embodiment does not need such a second inlet of the flash vessel (18).

As set out above, the main advantage of the first embodiment is that at least parts, preferably all, of the solid polymer entrained in the first polymer-lean stream (11), which equals the top stream of the gravimetric separator, is recovered by the subsequently connected flash separator. As the amount of solid polymer in the top stream of the gravimetric separator and introduced into the flash separator is by far lower than in a comparable case, in which only one flash separator is used, the flash separator of the present invention can be run at conditions, which have significantly reduced energy consumption. This is achieved by lower drops of temperatures and pressures.

In a second, preferred, embodiment, the flash vessel (5) of the separating device according to the present invention further comprises a second inlet (18, dotted) for feeding a second polymer-rich stream (19, dotted line) split from the first polymer-rich stream (10), wherein the first outlet (3) of the separator vessel (1) is fluidly connected to the second inlet (18) of the flash vessel (5). This feedback of at least a part of the liquid polymer-rich stream into the flash vessel has the advantage that polymer deposit on the walls of the flash vessel (5) is reduced.

In a third, most preferred embodiment, the second rich-polymer phase stream (19) is fed via the second inlet (18), wherein the second inlet (18) is positioned between the liquid level (27) present in the flash vessel (5) and the the first inlet (6) of the flash vessel (5), wherein the liquid level (27) is the boundary between a gaseous phase and a liquid phase present in the flash vessel (5). This further improves the removal of the polymer so that nearly no polymer is deposited on the walls of the flash vessel (5) anymore.

Preferably, the separating device according to the present invention comprises a first heater (21) and/or a first pressure control valve (22) located upstream to the inlet (2) of the gravimetric vessel (1). This ensures that the temperature and pressure of the reaction mixture can be adjusted before entering the gravimetric separator of the separating device of the present invention.

In another preferred embodiment, the separating device according to the present invention comprises a second heater

(23) and a second pressure control valve (24) located upstream to the first inlet (6) of the flash vessel (5) and downstream of the second outlet (4) of the gravimetric vessel (1). This ensures that the temperature and pressure of the second polymer-lean stream (12) can be adjusted before entering the flash separator of the separating device of the present invention.

The first and/or the second heater may be one or more flash heaters, one or more jacketed pipes, or one or more heat exchangers. Preferably, the first heater is a heat exchanger. Preferably, the second heater is a heat exchanger.

Preferably, a static mixer is placed upstream of the flash separator to improve the homogeneity of the reaction mixture (not shown in FIG. 2).

In a first most preferred embodiment of the invention, the bottom outlets (3) and (7) of the gravimetric (1) and the flash separator (5) are combined to form a polymer stream (20). In the embodiment where the second rich-polymer phase stream (19) is fed via the second inlet (18) into the flash separator (5), instead of the bottom stream (first polymer-rich stream (10)) of the gravimetric separator (1), the third polymer-rich stream (15) is combined with the bottom stream (14) of the flash separator (cf. FIG. 2).

In a second preferred embodiment, these outlets are not combined, but their streams are rather separately recovered. This setup enables a separation into polymers having high and very low molecular weights (e.g. below 10,000 g/mol).

Process of the Present Invention

The process of the present invention comprises a production process for a polymer and the actual separating process, in which the volatile compounds such as monomers, optional comonomers and optional solvents are removed from the reaction mixture and, hence, from the polymer. These steps are described in detail in the following.

Production of the Reaction Mixture

The reaction mixture could be prepared using any process for the production of a polymer which requires the subsequent separation of volatile compounds from the polymer after production. Preferably, the present invention is applicable for supercritical, solution and advanced solution polymerization processes. More preferably are continuous supercritical, solution and advanced solution polymerization processes. Most preferably, the production process comprises a continuous solution polymerisation process.

The polymer produced in the present invention can be any polymer, for the production of which volatile compounds are used. Preferably, the polymer produced in the present invention is an olefin homo- or copolymer. More preferably, the monomer of this polymer is selected from an α-olefin having a carbon atom number of 2 to 4, preferably ethylene, propylene, 1-butene, most preferably from ethylene. Most preferably, the polymer is a polyethylene homopolymer.

In case the polymer is a copolymer, the comonomer preferably is different from the α-olefin monomer and is selected from the group consisting of linear and cyclic olefins and α-olefins having from 2 to 12 carbon atoms and mixtures thereof. More preferably, the comonomer is an α-olefin different from the olefin monomer and is selected from the group consisting of linear olefins having from 2 to 12 carbon atoms and mixtures thereof, preferably 4 to 10 carbon atoms, most preferably 1-octene.

Most preferably, the olefin polymer of the present invention is a polymer having a $MFR_2$ value of between 0.2 and 100 g/10 min, preferably between 1.0 and 60 g/10 min, and most preferably between 1.5 and 30 g/10 min.

Preferably, the polymer has a molecular weight of lower than 100 kg/mol, preferably lower than 80 kg/mol and most preferably lower than 65 kg/mol.

The density of the polymer of the present invention is between 960 and 845 kg/m$^3$, preferably between 940 and 850 kg/m$^3$, and most preferably between 930 and 855 kg/m$^3$.

In a most preferred embodiment, the polymer is produced in a solution polymerisation process as disclosed in the following.

The polymerisation is typically conducted in the presence of an olefin polymerisation catalyst. Such olefin polymerisation catalysts comprise a transition metal compound, preferably a metal compound of group 4, such as a compound of titanium, zirconium or hafnium.

The transition metal compound may be a halide of the transition metal, such as a trihalide or a tetrahalide. Typically the transition metal halide is a titanium halide, such as titanium trichloride or titanium tetrachloride.

The transition metal compound may also be a transition metal alkyl or transition metal alkoxide compound. Such compounds are often contacted with a chlorinating compound, such as an alkyl chloride.

The transition metal compound may be combined with a group 2 metal halide, such as magnesium halide, like magnesium dichloride, and/or with a group 13 metal halide, such as aluminium or boron halide, like aluminium trichloride. Such catalysts are well known in the art and are referred to as Ziegler-Natta catalysts. A Ziegler-Natta catalyst is typically used in combination with a cocatalyst, such as an aluminium alkyl.

The transition metal compound may also be a compound comprising an organic ligand having a cyclopentadienyl structure, such as cyclopentadienyl, fluorenyl or indenyl. Such organic ligands may also bear substituents. The transition metal may have one or two such organic ligands, which optionally are bridged, and two or three other ligands, such as alkyl, aryl or halide. Such catalysts are also well known in the art and are referred to as metallocene catalysts.

In a solution polymerisation process a solvent is also present. The solvent is in liquid or supercritical state in the polymerisation conditions. The solvent is typically and preferably a hydrocarbon solvent. The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

Also other components may be added into the reactor. It is known to feed hydrogen into the reactor for controlling the molecular weight of the polymer formed during the polymerisation. Also the use of different antifouling compounds is known in the art. In addition different kinds of activity boosters or activity retarders may be used for controlling the activity of the catalyst.

Typically the content of the polymer in the reaction mixture comprising the solvent, the polymer and the unreacted monomer and optionally comonomer is from 10 to 50 wt %, preferably from 10 to 40 wt %, more preferably from 10 to 35 wt %.

The stream of the reaction mixture (9) is the feed stream to the separating device. It may be the product stream from the polymerisation reactor, as discussed above. The reaction mixture stream then typically has the polymer content, composition temperature and pressure as disclosed above.

The reaction mixture comprises the polymer, at least one unreacted monomer, and optionally at least one unreacted comonomer. Depending on the polymerisation process the reaction mixture may further comprise at least one solvent.
Separating Process The volatile compounds are removed from the polymer stream in a setup comprising at least one or more gravimetric separators and at least one or more flash separators. Preferably, the removal of volatile compounds is achieved in a setup comprising a gravimetric separator and a flash separator, most preferably in this order.

In the gravimetric separator, the major amount of polymer is removed from the reaction mixture. In the flash separator, the pressure is reduced and thereby the volatile compounds are removed from the remaining reaction mixture without entrainment of solid polymer into the gaseous phase.

The reaction mixture stream (9) is preferably heated prior to its entry to the separator. The heating may be achieved by passing the solution through the first heater (11) located upstream of the gravimetric vessel (1) of the gravimetric separator. The reaction mixture is preferably preheated before entering the gravimetric separator to enhance the separation of different volatile compounds, i.e. monomer, comonomer and the solvent.

The reaction mixture (9) enters the gravimetric separator through the first inlet (2). The conditions in the gravimetric vessel (1) are chosen to result in a liquid-liquid phase separation of the volatile compounds such as monomers, optional comonomers and optional solvents and the polymer. The volatile compounds are removed from the upper part of the gravimetric vessel via the second outlet (4) as the first polymer-lean stream (11). The polymer is then removed via the first outlet (3) as the first polymer-rich stream (10).

The first polymer-lean stream (11) removed via the first outlet (3) is then split up into the third polymer-lean stream (16) and the second polymer-lean stream (12). The second polymer-lean stream (12) is then fed into the flash vessel (5) of the flash separator via the first inlet (6). In a preferred embodiment, the first polymer lean stream (11) is not split up, but is transferred completely via the second polymer-lean stream (12) into the flash vessel (5). This preferred embodiment has the advantage that it probability that polymer can be entrained into the equipment following the volatile compounds stream (17) is further reduced.

In a preferred embodiment, the second polymer-lean stream (12) is preferably heated prior to its entry into the flash separator. The heating may be achieved by passing the solution through the second heater (23). The reaction mixture is preheated before entering the flash separator to enhance the separation of different volatile compounds, i.e. monomer, comonomer and the solvent. Where necessary, the pressure of the second polymer-lean stream (12) is preferably reduced before being fed to the flash separator by the second pressure control valve (24).

The pressure in the flash separator is during operation typically from 0 to 500 barg, preferably 0.5 to 450 barg, more preferably 1.0 to 400 barg, even more preferably 2.0 to 300 barg.

The temperature in the flash separator is during operation typically from 100 to 400° C., preferably 130 to 300° C., more preferably 140 to 275° C. The temperature should be sufficiently high to keep the viscosity of the solution at a preferably low level that enhances the separation of the hydrocarbons, but below the temperature at which the polymer is degraded.

According to the present invention volatile compounds are removed from the reaction mixture (9) in at least one flashing step. It is thus possible to remove the volatile compounds in two or more flashing steps where each flashing step is conducted in a dedicated flash separator. However, the most preferred embodiment in view of reduced energy consumption comprises only one flashing step.

Hence, in a first embodiment of the invention, the process for separating volatile compounds from a reaction mixture (9) comprising a polymer and said volatile compounds, comprises the steps of passing the reaction mixture (9) through the inlet (2) into the gravimetric vessel (1) of the gravimetric separator of the separating device according to the invention, withdrawing the first polymer-rich stream (10) comprising mainly polymer through the first outlet (3) of the gravimetric vessel (1), withdrawing the first polymer-lean stream (11) comprising mainly volatile compounds through the second outlet (4) of the gravimetric vessel (1), passing at least a part of the polymer-lean stream (11) as the second polymer-lean stream (12) through the first inlet (6) into the flash vessel (5) of the flash separator of the separating device according to the invention, withdrawing the liquid stream (14) through the first outlet (7) of the flash vessel (5), and withdrawing the gaseous stream (13) through the second outlet (8) of the flash vessel (5).

According to a second, preferred, embodiment, in the process according to the invention the flash separator comprises a second inlet (18), wherein first outlet (3) of the gravimetric vessel (1) is fluidly connected to the second inlet (18) of the flash vessel (5). This process further comprises the step of passing at least a part of the first polymer-rich stream (10) as the second polymer-rich stream (19) through the second inlet (18) into the flash vessel (5). This feedback of at least a part of the liquid polymer-rich stream into the flash vessel has the advantage that polymer deposit on the walls of the vessel is reduced.

In a third, most preferred embodiment, in the process according to the second embodiment, in the step of step of passing the first polymer-rich stream (10) as the second polymer-rich stream (19) through the second inlet (18) into the flash vessel (5), the second rich-polymer phase stream (19) is fed via the second inlet (18) between the liquid level (27) present in the flash vessel (5) and the first inlet (6) of the flash vessel (5), wherein the liquid level (27) is the boundary between the gaseous phase and the liquid phase present in the flash vessel (5). This further improves the removal of the polymer so that nearly no polymer is deposited on the walls of the vessel anymore.

In one embodiment, the first polymer-lean stream (11) is split into the second polymer-lean stream (12) and a third polymer-lean stream (16). Preferably, the first polymer-lean stream (11) is completely transferred into the second polymer-lean stream (12).

Preferably, in the process according to the invention, the third polymer-lean stream (16) and the gaseous stream (13) are combined to form a volatile compounds stream (17).

In a first preferred embodiment of the inventive process, the third polymer-rich stream (15) and the liquid stream (14) are combined to form the polymer stream (20).

In a second preferred embodiment, the third polymer-rich stream (15) and the the liquid stream (14) are separately recovered as the main polymer stream (25) and the minor polymer stream that consists of the low molecular polymer (26). As the polymer recovered from the flash separator (5) is fed by the first polymer-lean stream (11) of the gravimetric separator (11), comprising polymer having mainly low molecular weight, the polymer recovered from flash separator has lower molecular weight than the polymer recovered from the gravimetric separator. Hence, this most preferred embodiment is able to achieve not only a separation of polymer from volatile compounds, but can also also provide polymer separation based on the molecular weight of the polymer.

Preferably, in the process of the present invention, the second polymer-lean stream (12) is heated by the second heater (23) to the temperature as provided in the flash vessel (5).

Furthermore, preferably, in the process according to the invention, the pressure of the second polymer-lean stream (12) may be reduced before introduction into the flash separator by the second pressure control valve (24).

Measurement and Simulation Methods

Melt Flow Rate

The melt flow rate ($MFR_2$) is determined under a load of 2.16 kg at 190° C. according to ISO 1133-1 method B and is indicated in g/10 min.

Density

Density of the polymer is measured according to ISO 1183-1 method A using compression moulded samples. It is indicated in $kg/m^3$.

Simulation Method

Aspen Polymers® was used to make the required steady-state simulations using pre-selected process operating conditions.

EXAMPLES

Comparative Example 1

In this comparative example, the outlet of the polymerization reactor is connected to a low critical solution temperature (LCST) separator (gravimetric separator) only. The conditions in the separator are set to ensure the presence of two liquid phases in the separator: a polymer-lean and a polymer-rich phase.

TABLE 1

Process conditions for comparative example 1

| Polymerization reactor | |
|---|---|
| $MFR_2$ (polyethylene) | 3.0 g/10 min |
| Density (polyethylene) | 902 $kg/m^3$ |
| Temperature | 180° C. |
| Pressure | 90 bar |
| Gravimetric separator | |
| Temperature | 200° C. |
| Pressure | 45 bar |

| Outlet flows [kg/h] | Polymer-lean phase | Polymer-rich phase |
|---|---|---|
| 1-octene | 1916 | 835 |
| Iso-octene | 911 | 2089 |
| hexane | 19234 | 6766 |
| polyethylene | 2.8 | 7447 |

Table 1 summarizes the operating conditions. As the $MFR_2$ of the produced polyethylene is higher than 1.5 g/10 min, a polyethylene having low average molecular weight is produced. Table 1 furthermore shows the corresponding conditions in the gravimetric separator as well as the resulting amounts of components to be found in the respective outlet streams of the gravimetric separator (polymer-lean and polymer-rich phase).

This solid polymer can deposit in the equipment for further processing the gaseous polymer-lean stream installed subsequently to the flash separator and cause detrimentally fouling of such equipment.

Inventive Example 1

In the inventive example 1, instead of a gravimetric separator only, a separating device according to the present invention and as depicted in FIG. 2 has been connected to the outlet of the polymerization reactor. As described above, such a separating device comprises a gravimetric separator combined with a flash separator.

TABLE 2

Process conditions for the inventive example 1

| Polymerization reactor | |
|---|---|
| $MFR_2$ (polyethylene) | 3.0 g/10 min |
| Density (polyethylene) | 902 $kg/m^3$ |
| Temperature | 180° C. |
| Pressure | 90 bar |
| Gravimetric separator | |
| Temperature | 200° C. |
| Pressure | 45 bar |
| Flash separator | |
| Temperature | 200° C. |
| Pressure | 7 bar |

| Outlet flows [kg/h] | Polymer-lean phase | Polymer-rich phase |
|---|---|---|
| polyethylene | 0 | 2.8 |
| Liquid fraction | 0 | 1 |

Table 2 summarizes the process conditions in the outlets of the polymerization reactor, the gravimetric separator and the flash separator of the separating device of the inventive example 1. Hence, the conditions at the outlets of both the polymerization reactor and gravimetric separator are equal to the conditions of comparative example 1.

It can be seen from the results shown in table 2 that the separating device of the present invention is able to completely remove the solid polyethylene as well as any liquid phase from the gaseous polymer-lean stream. Furthermore, it is a general advantage of the present invention that it can reduce the energy consumption of the whole process.

What is claimed is:

1. A process for separating volatile compounds from a reaction mixture (9) comprising a polymer and said volatile compounds using a separating device comprising:
   a gravimetric separator, having a gravimetric vessel (1), an inlet (2) for feeding the polymer reaction mixture (9), a first outlet (3) located in the lower part of the gravimetric vessel (1) for withdrawing a first polymer-rich stream (10), and a second outlet (4) located in the upper part of the gravimetric vessel (1) for withdrawing a first polymer-lean stream (11); and
   a flash separator having a flash vessel (5), a first inlet (6) for feeding a second polymer-lean stream (12) split from the first polymer-lean stream (11), a first outlet (7) located at the lower part of the flash vessel (5) for withdrawing a liquid stream (14), and a second outlet (8) located at the upper part of the flash vessel (5) for withdrawing a gaseous stream (13), wherein the flash separator further comprises a second inlet (18) for feeding a second polymer-rich stream (19) from the first polymer rich stream (10), wherein the first outlet (3) of the gravimetric vessel (1) is fluidly connected to the second inlet (18) of the flash vessel (5)

wherein the second outlet (4) of the separator vessel (1) is fluidly connected to the first inlet (6) of the flash vessel (5);

the process comprising the steps of:

passing the reaction mixture (9) through the inlet (2) into the gravimetric vessel (1) of the gravimetric separator of the separating device, withdrawing a first polymer-rich stream (10) comprising mainly polymer through the first outlet (3) of the gravimetric vessel (1), passing at least a part of the first polymer-rich stream (10) as the second polymer-rich stream (19) through the second inlet (18) into the flash vessel (5), withdrawing a first polymer-lean stream (11) comprising mainly volatile compounds through the second outlet (4) of the gravimetric vessel (1), passing at least a part of the polymer-lean stream (11) as a second polymer-lean stream (12) through the first inlet (6) into the flash vessel (5) of the flash separator of the separating device, withdrawing a liquid stream (14) through the first outlet (7) of the flash vessel (5), and withdrawing a gaseous stream (13) through the second outlet (8) of the flash vessel (5).

2. The process according to claim 1, wherein the second polymer-rich stream (19) is fed via the second inlet (18) between a liquid level (27) present in the flash vessel (5) and the first inlet (6) of the flash vessel (5), wherein the liquid level (27) is the boundary between a gaseous phase and a liquid phase present in the flash vessel (5).

3. The process according to claim 1, wherein the third polymer-lean stream (16) and the gaseous stream (13) are combined to form a volatile compounds stream (17).

4. The process according to claim 2, wherein the third polymer-rich stream (15) and the liquid stream (14) are combined to form the polymer stream (20).

5. The process according to claim 1, wherein the second polymer-lean stream (12) is heated by a second heater (23) to the temperature as provided in the flash vessel (5).

6. The process according to claim 1 comprising the step of reducing the pressure of the second polymer-lean stream (12) before introduction into the flash separator.

7. The process according to claim 1 wherein the pressure within the flash separator is from 0 to 500 barg.

8. The process according to claim 1 wherein the temperature within the flash separator is from 100 to 400° C.

9. The process according to claim 1 wherein the pressure within the gravimetric separator is from 0 to 500 barg.

10. The process according to claim 1 wherein the temperature within the gravimetric separator is from 100 to 400° C.

* * * * *